United States Patent
Liu et al.

(10) Patent No.: US 11,991,482 B2
(45) Date of Patent: May 21, 2024

(54) ILLUMINATION SYSTEM, PROJECTION DEVICE, AND PROJECTION CONTROL METHOD

(71) Applicant: Coretronic Corporation, Hsin-Chu (TW)

(72) Inventors: Chi-Fu Liu, Hsin-chu (TW); Tsung-Hsin Liao, Hsin-Chu (TW); Chun-Li Chen, Hsinchu (TW); Hung-Yu Lin, Hsin-chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 17/975,607

(22) Filed: Oct. 28, 2022

(65) Prior Publication Data

US 2023/0134505 A1    May 4, 2023

(30) Foreign Application Priority Data

Nov. 4, 2021 (CN) .......................... 202111297969.6

(51) Int. Cl.
*H04N 9/31* (2006.01)
*G03B 21/20* (2006.01)

(52) U.S. Cl.
CPC ....... *H04N 9/3164* (2013.01); *G03B 21/2066* (2013.01); *H04N 9/3182* (2013.01); *H04N 9/3197* (2013.01)

(58) Field of Classification Search
CPC .. H04N 9/3164; H04N 9/3187; H04N 9/3197; G03B 21/2066
USPC .......................................................... 353/30
See application file for complete search history.

(56) References Cited

U.S. PATENT DOCUMENTS

2020/0192114 A1\* 6/2020 Chen .................. G03B 21/2066

FOREIGN PATENT DOCUMENTS

CN          111381427          7/2020

\* cited by examiner

*Primary Examiner* — Jerry L Brooks
(74) *Attorney, Agent, or Firm* — JCIPRNET

(57) ABSTRACT

An illumination system, a projection device, and a projection control method are provided. The illumination system includes a first light-emitting unit, a second light-emitting unit, a third light-emitting unit, a first dichroic element, a second dichroic element, and a control unit. The first light-emitting unit includes a first light-emitting element and a second light-emitting element. The control unit is electrically connected to the first light-emitting unit and configured to switch the illumination system between a high-performance mode and a high-chroma mode, wherein when the illumination system is in the high-performance mode, the control unit controls a current ratio of the second light-emitting element to be greater than a current ratio of the first light-emitting element, and when the illumination system is in the high-chroma mode, the control unit controls the current ratio of the second light-emitting element to be less than the current ratio of the first light-emitting element.

12 Claims, 8 Drawing Sheets

ILLUMINATION SYSTEM, PROJECTION DEVICE, AND PROJECTION CONTROL METHOD

CROSS-REFERENCE TO RELATED APPLICATION

This application claims the priority benefit of China application serial no. 202111297969.6 filed on Nov. 4, 2021. The entirety of the above-mentioned patent application is hereby incorporated by reference herein and made a part of this specification.

BACKGROUND OF THE INVENTION

Field of the Invention

The invention relates to an optical system, an optical device including the optical system, and a control method, and more particularly to an illumination system, a projection device, and a projection control method.

Description of Related Art

In recent years, a projection device based on a solid-state light source such as a light-emitting diode (LED) and a laser diode has gradually earned a place in the market. An existing projection device uses an independent light source of a light-emitting diode with three primary colors as the source of the illumination light beams thereof, and these illumination light beams are then modulated by a light valve to project image light beams to the outside.

However, because the current light source efficiency of green light-emitting diodes is insufficient, when there is a need for higher brightness, blue light-emitting diodes are used to excite yellow-green phosphors to obtain higher-efficiency green light, and the blue light-emitting diodes and the yellow-green phosphors are together used as another projection device model of green light source. However, the relative spectral green purity of the green light generated by excitation is not pure enough, thus causing the issue that the color point of the white light formed by mixing light at the end has a yellowish color shift. As a result, the color gamut of the resulting illumination light beam is smaller, and the color gamut requirements of the display market may not be met.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY OF THE INVENTION

The invention provides an illumination system and a projection device that have good reliability and produce an output light beam with good color performance.

The invention provides a projection control method that may readily adjust an illumination light beam and produce a final output image light beam with good color performance.

Other objects and advantages of the invention may be further understood from the technical features disclosed in the invention.

In order to achieve one or part or all of the above objectives or other objectives, an embodiment of the invention provides an illumination system. The illumination system includes a first light-emitting unit, a second light-emitting unit, a third light-emitting unit, a first dichroic element, a second dichroic element, and a control unit. The first light-emitting unit includes a first light-emitting element and a second light-emitting element. The first light-emitting element provides a first sub-light beam, and the second light-emitting element provides a second sub-light beam. A main light emission wavelength range of the first sub-light beam falls within a main light emission wavelength range of the second sub-light beam, and the main light emission wavelength range of the second sub-light beam is greater than the main light emission wavelength range of the first sub-light beam. The second light-emitting unit is configured to provide a second light beam. The third light-emitting unit is configured to provide a third light beam. The first dichroic element is located on a transmission path of the second light beam and the third light beam. The second dichroic element is located on a transmission path of the first sub-light beam, the second sub-light beam, the second light beam, and the third light beam. The second light beam is transmitted to the second dichroic element after being reflected by the first dichroic element, the third light beam is transmitted to the second dichroic element after passing through the first dichroic element. The second light beam and the third light beam are reflected by the second dichroic element to form a portion of an illumination light beam, and at least one of the first sub-light beam and the second sub-light beam is reflected by the second dichroic element or passes through the second dichroic element to form another portion of the illumination light beam. The control unit is electrically connected to the first light-emitting unit and configured to switch the illumination system between a high-performance mode and a high-chroma mode. When the illumination system is in the high-performance mode, the control unit controls a current ratio of the second light-emitting element to be greater than a current ratio of the first light-emitting element, and when the illumination system is in the high-chroma mode, the control unit controls the current ratio of the second light-emitting element to be less than the current ratio of the first light-emitting element.

In order to achieve one or part of or all of the above objectives or other objectives, an embodiment of the invention provides a projection device. The projection device includes the illumination system above, at least one light valve, and a projection lens. The light valve is located on a transmission path of an illumination light beam and is adapted to convert the illumination light beam into an image light beam. The projection lens is located on a transmission path of the image light beam, and is adapted to project the image light beam out of the projection device.

In order to achieve one or part of or all of the above objectives or other objectives, an embodiment of the invention provides a projection control method. The projection control method is configured to switch a projection device between a high-performance mode and a high-chroma mode, wherein the projection device includes a first light-emitting unit, a second light-emitting unit, a third light-emitting unit, a first dichroic element, a second dichroic element, and a control unit, the first light-emitting unit includes a first light-emitting element and a second light-emitting element, the first light-emitting element provides a first sub-light beam, the second light-emitting element provides a second sub-light beam, a main light emission wavelength range of the first sub-light beam falls within a main light emission wavelength range of the second sub-light beam, the main light emission wavelength range of the second sub-light beam is greater than the main light emission wavelength range of the first sub-light beam, the second light-emitting unit is configured to provide a second light beam, the third light-emitting unit is configured to provide a third light beam, the first dichroic element is located on a transmission path of the second light beam and the third light beam, and the second dichroic element is located on a transmission path of the first sub-light beam, the second sub-light beam, the second light beam, and the third light beam. The second light beam is transmitted to the second dichroic element after being reflected by the first dichroic element, the third light beam is transmitted to the second dichroic element after passing through the first dichroic element, the second light beam and the third light beam are reflected by the second dichroic element to form a portion of an illumination light beam, at least one of the first sub-light beam and the second sub-light beam is reflected by the second dichroic element or passes through the second dichroic element to form another portion of the illumination light beam, and the projection control method includes the following steps. When the projection device is in the high-performance mode, a current ratio of the second light-emitting element is controlled to be greater than a current ratio of the first light-emitting element. When the projection device is in the high-chroma mode, the current ratio of the second light-emitting element is controlled to be less than the current ratio of the first light-emitting element.

Based on the above, the embodiments of the invention have at least one of the following advantages or efficacies. In an embodiment of the invention, the illumination system and the projection device may control the different current ratios of the first light-emitting element and the second light-emitting element via the control unit, so as to adjust the composition of the green light portion in the illumination light beam. In turn, the illumination system and the projection device may meet the requirements of both efficacy and color performance. Moreover, the projection control method of the present embodiment may readily switch the illumination system and the projection device between the high-performance mode and the high-chroma mode. Therefore, the efficacy and color performance requirements of the illumination system and the projection device may both be met.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top", "bottom", "front", "back", etc., is used with reference to the orientation of the Figure(s) being described. The components of the invention may be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including", "comprising", or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
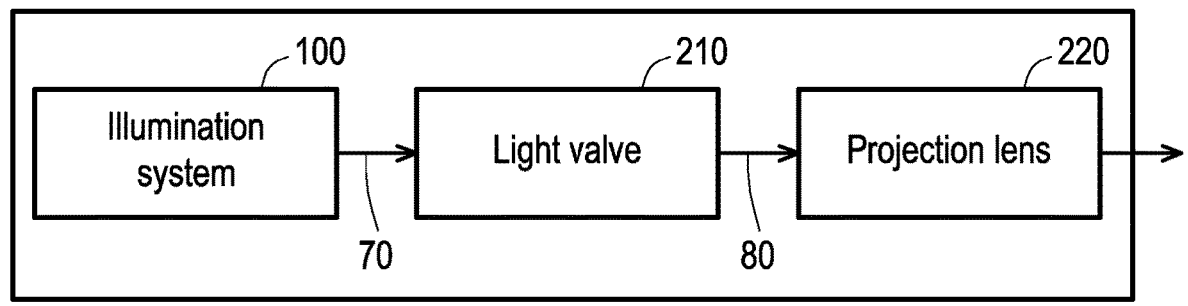
FIG. 1 is a block diagram of a projection device of an embodiment of the invention.
Figure 2A:
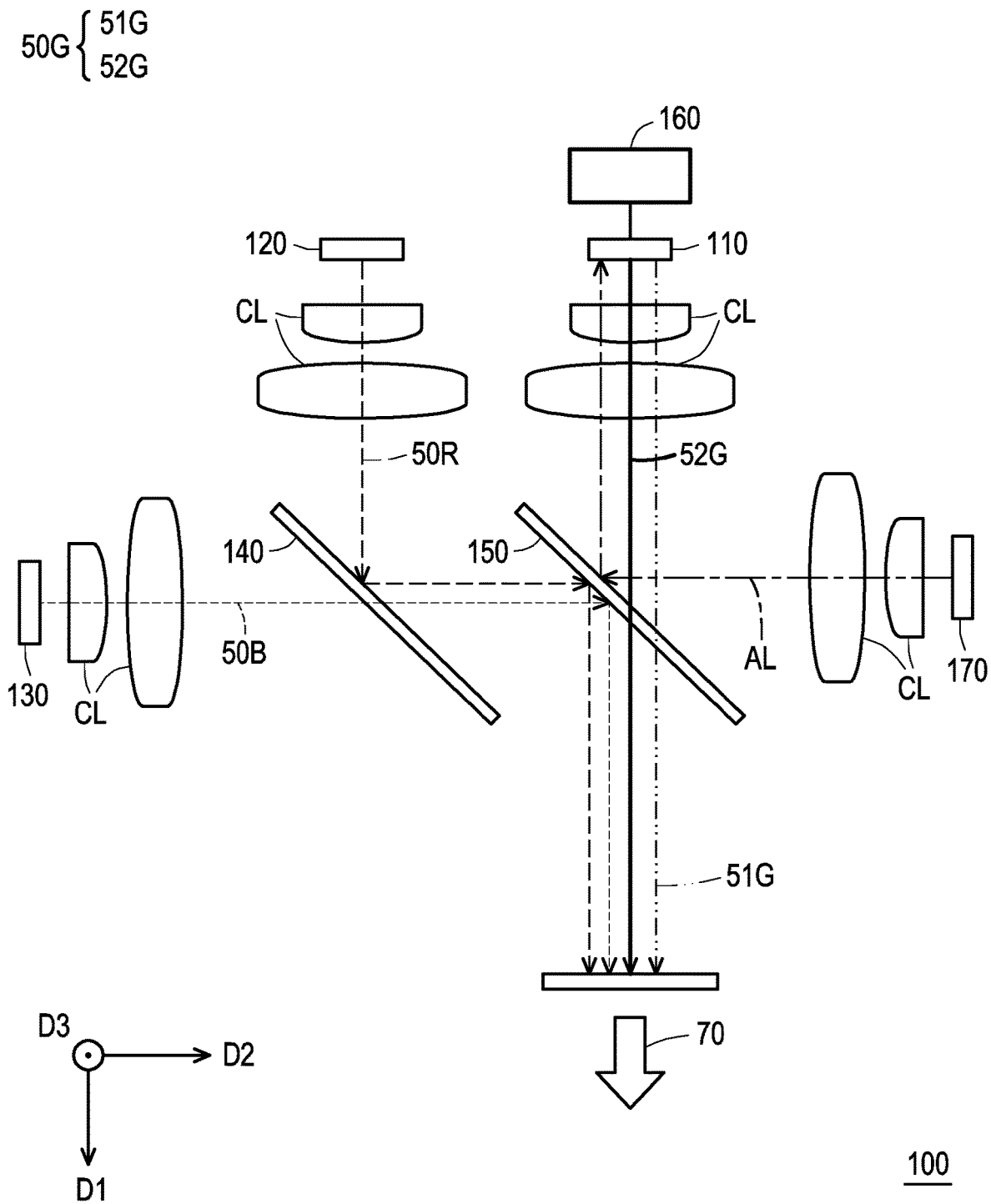
FIG. 2A is a schematic diagram of the optical path architecture of an illumination system of FIG. 1.
Figure 2B:
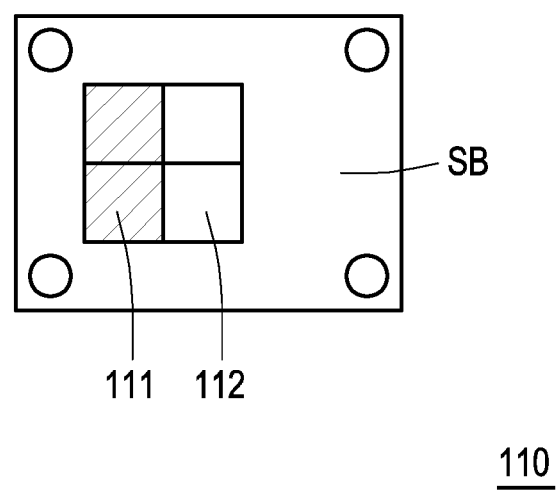
FIG. 2B is a schematic front view of the first light-emitting element and the second light-emitting element of FIG. 2A.
Figure 2C:
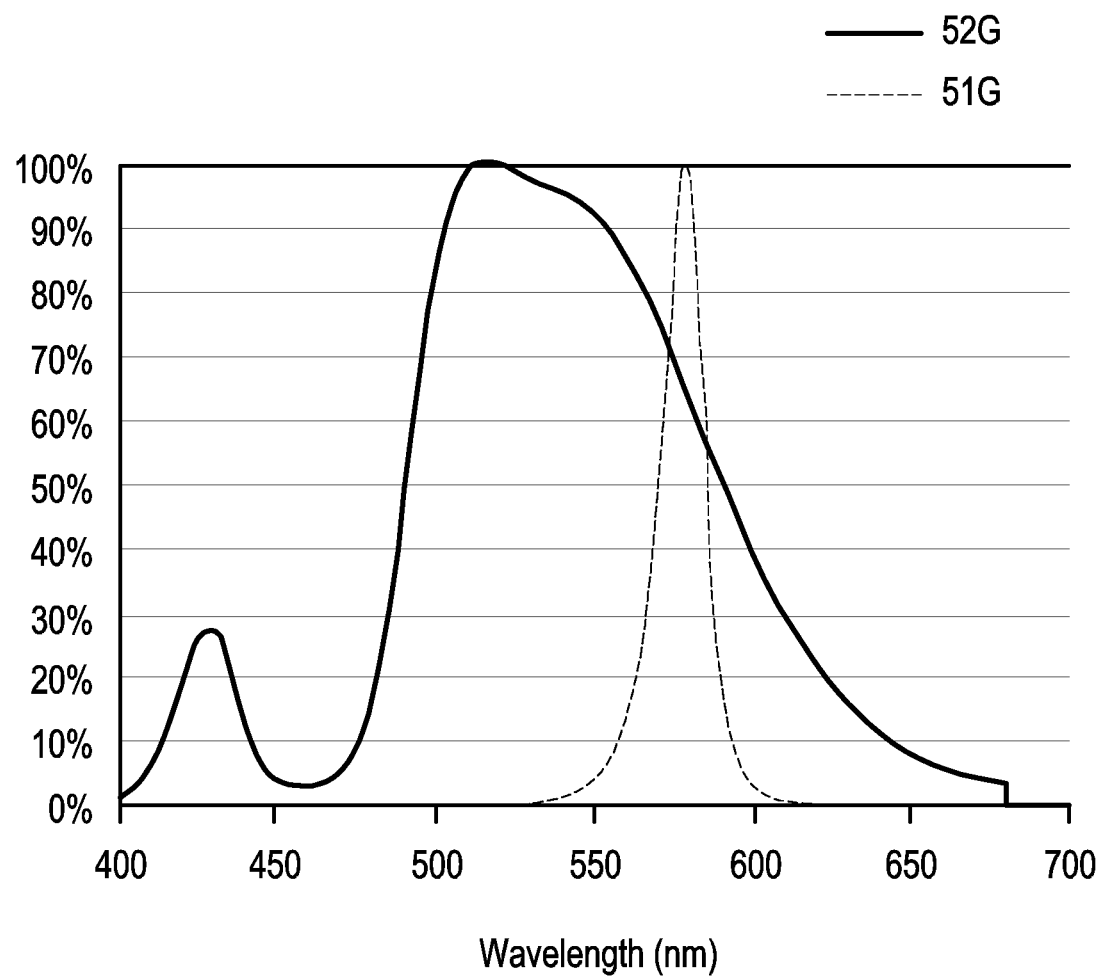
FIG. 2C is a graph of the light emission wavelength spectrum and brightness of the first sub-light beam and the second sub-light beam of FIG. 2A.

FIG. 1 is a block diagram of a projection device of an embodiment of the invention. FIG. 2A is a schematic diagram of the optical path architecture of an illumination system of FIG. 1. FIG. 2B is a schematic front view of the first light-emitting element and the second light-emitting element of FIG. 2A. FIG. 2C is a graph of the light emission wavelength spectrum and brightness of the first sub-light beam and the second sub-light beam of FIG. 2A. Referring to FIG. 1, in the embodiment, a projection device 200 includes an illumination system 100, at least one light valve 210, and a projection lens 220. The light valve 210 is located on the transmission path of an illumination light beam 70 and is adapted to convert the illumination light beam 70 into image light beam 80. The projection lens is located on the transmission path of the image light beam 80, and is adapted to project the image light beam 80 out of the projection device. In the embodiment, the number of the light valve 210 is one, but the invention is not limited thereto. In other embodiments, the number of the light valve 210 may also be a plurality. When the number of the light valve 210 is three, the illumination light beam may be output to the light valves 210 at the same time. When the number of the light valve 210 is less than three, the illumination light beam may sequentially output a portion of different colors of light in a sequential rotation output manner. Moreover, in the embodiment, the light valve 210 may be a digital micro-mirror device (DMD) or a liquid-crystal-on-silicon (LCOS) panel. However, in other embodiments, the light valve 210 may also be a transmissive liquid-crystal panel or other light beam modulators.

Specifically, as shown in FIG. 1 and FIG. 2A, in the embodiment, the illumination system 100 is adapted to emit the illumination light beam 70. The illumination system 100 includes a first light-emitting unit 110, a second light-emitting unit 120, a third light-emitting unit 130, a first dichroic element 140, a second dichroic element 150, and a control unit 160. Moreover, an optical lens group CL may respectively be disposed on the respective light-emitting beam transmission paths of the first light-emitting unit 110, the second light-emitting unit 120, and the third light-emitting unit 130, so that the light beams emitted by the first light-emitting unit 110, the second light-emitting unit 120, and the third light-emitting unit 130 are collimated.

Please refer further to FIG. 2A and FIG. 2B, in the embodiment, the first light-emitting unit 110 includes a first light-emitting element 111 and a second light-emitting element 112, and the first light-emitting element 111 and the second light-emitting element 112 are packaged on a same substrate SB. The first light-emitting element 111 and the second light-emitting element 112 respectively provide a first sub-light beam 51G and a second sub-light beam 52G. Moreover, the second light-emitting unit 120 and the third light-emitting unit 130 are respectively configured to provide a second light beam 50R and a third light beam 50B. In the embodiment, the first light-emitting element 111 is a green light-emitting diode, the second light-emitting unit 120 is a red light-emitting diode, and the third light-emitting unit 130 is a blue light-emitting diode. In other words, in the embodiment, the first sub-light beam 51G is pure green light, the second light beam 50R is pure red light, and the third light beam 50B is pure blue light.

Moreover, as shown in FIG. 2B, in the embodiment, the second light-emitting element 112 is a structure in which the blue light-emitting diode is covered with a yellow-green phosphor. In this way, when the second light-emitting element 112 emits light, the yellow-green phosphor may be excited by the pure blue light to form the second sub-light beam 52G of yellow-green light. In addition, the second light-emitting element 112 of this structure has higher optical efficiency than the first light-emitting element 111, but has a relatively broader light emission spectrum. More specifically, in the embodiment, as shown in FIG. 2C, the main light emission wavelength range of the first sub-light beam 51G falls within the main light emission wavelength range of the second sub-light beam 52G, the main light emission wavelength range of the second sub-light beam 52G is greater than the main light emission wavelength range of the first sub-light beam 51G, and the main emission wavelength range is, for example, the FWHM range of the main light emission wavelength brightness (peak value), but is not limited thereto. The main light emission wavelength of the first sub-light beam 51G is, for example, greater than the main light emission wavelength of the second sub-light beam 52G. For example, in the embodiment, the main light emission wavelength range of the first sub-light beam 51G is between 570 nm and 585 nm (the main light emission wavelength range is 15 nm), and the main light emission wavelength range of the second sub-light beam 52G is between 490 nm and 590 nm (the main light emission wavelength range is 100 nm).

In addition, as shown in FIG. 2A, in the embodiment, the first dichroic element 140 is located on the transmission path of the second light beam 50R and the third light beam 50B. The second dichroic element 150 is located on the transmission path of the first sub-light beam 51G, the second sub-light beam 52G, the second light beam 50R, and the third light beam 50B. The second light beam 50R and the third light beam 50B are transmitted from the first dichroic element 140 to the second dichroic element 150, and the first dichroic element 140 is not on the transmission path of the first sub-light beam 51G and the second sub-light beam 52G. The second light-emitting unit 120 and the third light-emitting unit 130 are respectively located at two sides of the first dichroic element 140 (the light beams from the second light-emitting unit 120 and the third light-emitting unit 130 are respectively incident on different side surfaces of the first dichroic element 140). The first dichroic element 140 and the first light-emitting unit 110 are respectively located at two sides of the second dichroic element 150. Moreover, in the embodiment, the first dichroic element 140 is, for example, a dichroic mirror reflecting red light and letting light beams of other colors (such as blue light) pass through (in other embodiments, the first dichroic element 140 may be a dichroic mirror reflecting blue light and letting light beams of other colors pass through), and the second dichroic element 150 is, for example, a dichroic mirror reflecting red light and blue light and letting light beams of other colors (such as yellow-green light) pass through. In this way, as shown in FIG. 2A, the first sub-light beam 51G and the second sub-light beam 52G are formed into a first light beam 50G and transmitted to the second dichroic element 150, the second light beam 50R is transmitted to the second dichroic element 150 after being reflected by the first dichroic element 140, the third light beam 50B is transmitted to the second dichroic element 150 after passing through the first dichroic element 140, and the second dichroic element 150 reflects the second light beam 50R and the third light beam 50B to form the red and blue portions of the illumination light beam 70 and lets the first light beam 50G pass through to form the green portion of the illumination light beam 70. In other words, the illumination light beam 70 includes at least one of the first light beam 50G, the second light beam 50R, and the third light beam 50B. Moreover, as shown in FIG. 2A, in the embodiment, the exit directions of the first light beam 50G, the second light beam 50R, and the third light beam 50B leaving the illumination system 100 are the same, and the first light beam 50G, the second light beam 50R, and the third light beam 50B leave along a first direction Dl. For example, in an embodiment not shown, the illumination system 100 may further include a light-homogenizing element. The incident directions of the first light beam 50G, the second light beam 50R, and the third light beam 50B transmitted to the light-incident surface of the light-homogenizing element are the same (incident angles are substantially the same), and after the light passing through the light-homogenizing element is homogenized, the light travels toward the same direction from the light exit surface of the light-homogenizing element to leaves the illumination system 100.

In the embodiment, since the illumination system 100 may form the three primary colors of the illumination light beam 70 via the first sub-light beam 51G and the second sub-light beam 52G of the first light beam 50G, the second light beam 50R, and the third light beam 50B, there is no need to provide a color filter module. In other words, the main light emission wavelength range of the second sub-light beam 52G transmitted to the second dichroic element 150 is substantially the same as the main light emission wavelength range of the second sub-light beam 52G transmitted to the at least one light valve. Here, "substantially the same" means that the difference in the main light emission wavelength range is less than 5%.

Moreover, as shown in FIG. 2A, in the embodiment, the illumination system 100 may optionally be provided with an auxiliary light-emitting unit 170. The auxiliary light-emitting unit 170 is, for example, a blue light-emitting diode emitting short-wavelength blue light, and may be configured to provide an auxiliary light beam AL. The auxiliary light-emitting unit 170 and the first light-emitting unit 110 are located at the same side of the second dichroic element 150 (the light beams from the auxiliary light-emitting unit 170 and the first light-emitting unit 110 are respectively incident on the same side surface of the second dichroic element 150) and face the first dichroic element 140 and the second dichroic element 150. Moreover, the auxiliary light beam AL is transmitted to the second light-emitting element 112 of the first light-emitting unit 110 after being reflected by the second dichroic element 150. In the embodiment, the auxiliary light beam AL provided by the auxiliary light-emitting unit 170 may make the yellow-green phosphor of the second light-emitting element 112 be excited by more blue light, thereby increasing the light quantity of the second sub-light beam 52G. That is, the second sub-light beam 52G may include a light beam formed by the blue light-emitting diode of the second light-emitting element 112 and the auxiliary light-emitting unit 170 irradiating the yellow-green phosphor of the second light-emitting element 112.

It should be mentioned that, in the embodiment above, although the second dichroic element 150 is exemplified by a dichroic mirror reflecting red light and blue light and letting yellow-green light beam pass through, the invention is not limited thereto. In other embodiments, the second dichroic element 150 may also be a dichroic mirror reflecting yellow-green light and letting red and blue light beams pass through. In the embodiment, the exit directions of the first light beam 50G, the second light beam 50R, and the third light beam 50B leaving the illumination system 100 are also the same, but leave along a second direction D2. Moreover, since the second dichroic element 150 is configured to reflect one of the auxiliary light beam AL and the first light beam 50G and let the other of the auxiliary light beam AL and the first light beam 50G pass through; in the embodiment, the auxiliary light-emitting unit 170 and the first light-emitting unit 110 are located at two sides of the second dichroic element 150, and the auxiliary light beam AL is transmitted to the second light-emitting element 112 of the first light-emitting unit 110 after passing through the second dichroic element 150. Those having ordinary skill in the art may make appropriate changes to the optical path configuration thereof after referring to the invention to achieve similar effects and advantages as the embodiment of FIG. 2A, which should still fall within the scope of the invention, and are not repeated herein.

In the following, how the illumination system 100 forms various colors of the illumination light beam 70 in different modes is further explained with reference to FIG. 1, FIG. 2A, FIG. 2B, and FIG. 3.

Specifically, in the embodiment, the illumination system 100 has a high-performance mode and a high-chroma mode, and as shown in FIG. 2A, the control unit 160 is electrically connected to the first light-emitting unit 110 and configured to switch the illumination system 100 between the high-performance mode and the high-chroma mode. For example, the illumination system 100 and the projection device 200 shown in FIG. 1 and FIG. 2A may be configured to execute the projection control method of FIG. 3, so that when the illumination system 100 is in the high-performance mode, the control unit 160 controls the current ratio of the second light-emitting element 112 to be greater than the current ratio of the first light-emitting element 111, and when the illumination system 100 is in the high-chroma mode, the control unit 160 controls the current ratio of the second light-emitting element 112 to be less than the current ratio of the first light-emitting element 111, and the composition of the green portion in the illumination light beam 70 may be adjusted, so as to meet the requirements of both efficacy and color performance thereof. Here, the meaning of the current ratio is the ratio of the current passing through the first light-emitting element 111 (or the second light-emitting element 112) in the first light-emitting unit 110 to the overall current (that is, the total current passing through the first light-emitting unit 110).

Figure 3:
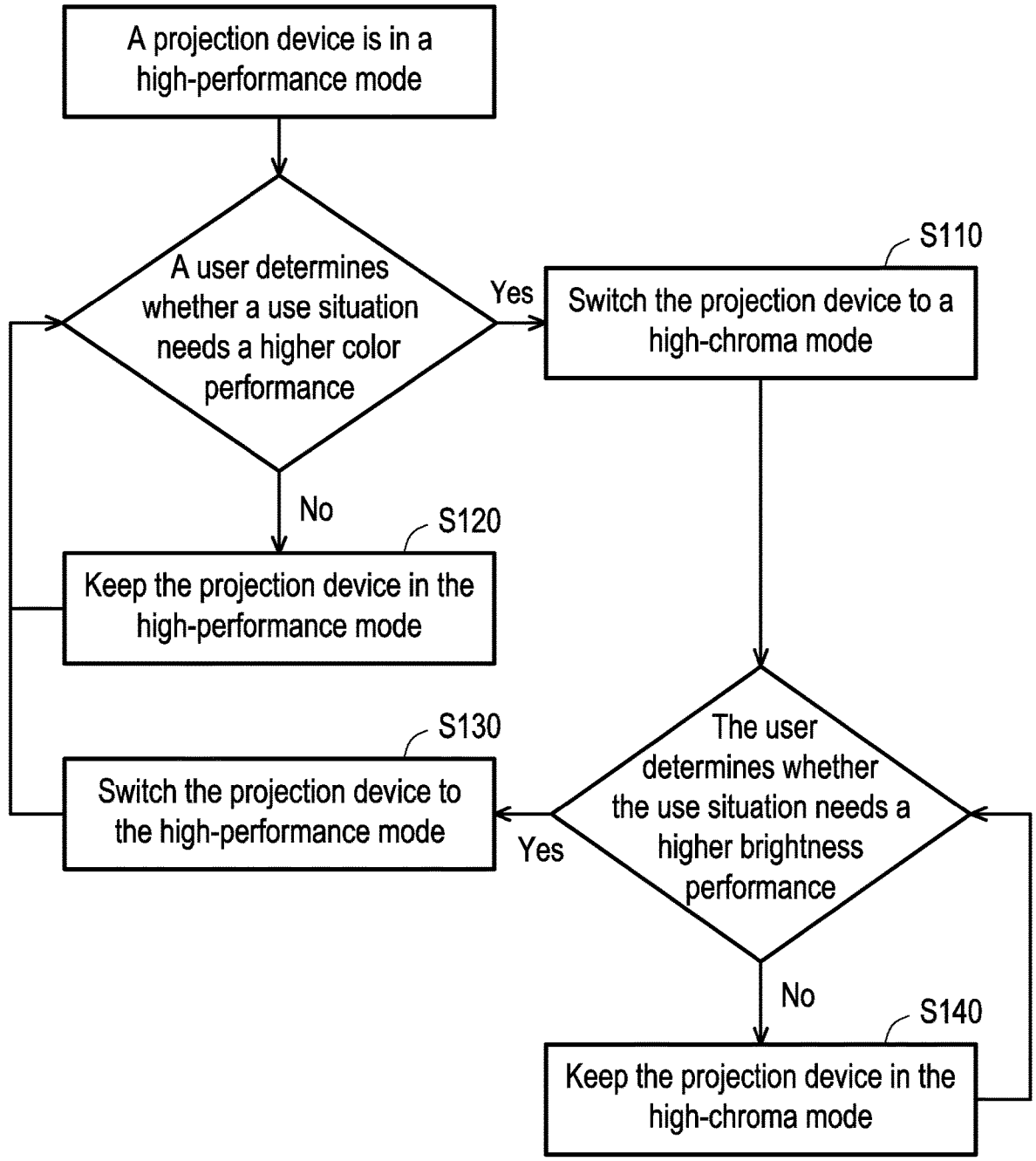
FIG. 3 is a flowchart of a projection control method of an embodiment of the invention.

In the invention, when the projection device 200 is in one of the high-performance mode and the high-chroma mode, whether the projection device 200 needs to be switched to the other of the high-performance mode and the high-chroma mode is determined. If yes, the projection device 200 is switched to the other of the high-performance mode and the high-chroma mode, and if not, the projection device 200 is kept in the original mode. For example, as shown in FIG. 3, when the projection device 200 is preset in the high-performance mode (the projection device 200 is in the high-performance mode), the control unit 160 may control the current ratio of the second light-emitting element 112 to be 90% to 95%, and control the current ratio of the first light-emitting element 111 to be 5% to 10%. At this time, since the current ratio of the second light-emitting element 112 is higher, the second sub-light beam 52G provided by the second light-emitting element 112 with higher light efficiency may provide most of the green light. In this way, the first light-emitting unit 110 may have a relatively higher light efficiency, but the relative spectral purity of the resulting first light beam 50G is lower, and the illumination light beam 70 formed thereby has a smaller color gamut, but the requirements of high brightness may be met.

Next, when the user determines that the use situation requires the projection device 200 to have a higher color performance (for example, the user acts to switch the mode), step S110 may be performed to switch the projection device 200 to the high-chroma mode. Specifically, when the projection device 200 is in the high-chroma mode, the control unit 160 controls the current ratio of the second light-emitting element 112 to be 5% to 10%, and controls the current ratio of the first light-emitting element 111 to be 90% to 95%. At this time, since the current ratio of the first light-emitting element 111 is higher, the first sub-light beam 51G with higher spectral purity may be used as most of the green light. The resulting first light beam 50G has a higher relative spectral purity, and may form an illumination light beam 70 with a larger color gamut to meet the requirements of a wide color gamut. Conversely, when the user determines that the use situation does not require the projection device 200 to have a higher color performance (for example, the user does not act to switch the mode), step S120 may be performed to keep the projection device 200 in the high-performance mode. Moreover, as shown in FIG. 3, when the projection device 200 is in the high-chroma mode, the user may also determine whether the projection device 200 needs to have a higher brightness performance. When the user determines that the projection device 200 needs to have a higher brightness performance, step S130 may be performed to switch the projection device 200 to the high-performance mode. When the user determines that the projection device 200 does not need to have a higher brightness performance, step S140 may be performed to keep the projection device 200 in the high-chroma mode.

In this way, the illumination system 100 and the projection device 200 may control the different current ratios of the first light-emitting element 111 and the second light-emitting element 112 via the control unit 160, so as to adjust the composition of the green light portion in the illumination light beam 70. In turn, the illumination system 100 and the projection device 200 may meet the requirements of both efficacy and color performance. Moreover, the projection control method of the embodiment may readily switch the illumination system 100 and the projection device 200 between the high-performance mode and the high-chroma mode. Therefore, the efficacy and color performance requirements of the illumination system 100 and the projection device 200 may both be met. It should be mentioned that, in other embodiments of the invention, the steps for the user to determine the use situation may be executed by the control unit 160. For example, the control unit 160 may automatically switch (or keep) to the high-chroma mode or the high-performance mode by comprehensively determining factors such as environmental brightness, projection content (video or presentation), and/or user settings, etc., thus further improving the convenience of using the projection device.

Figure 4A:
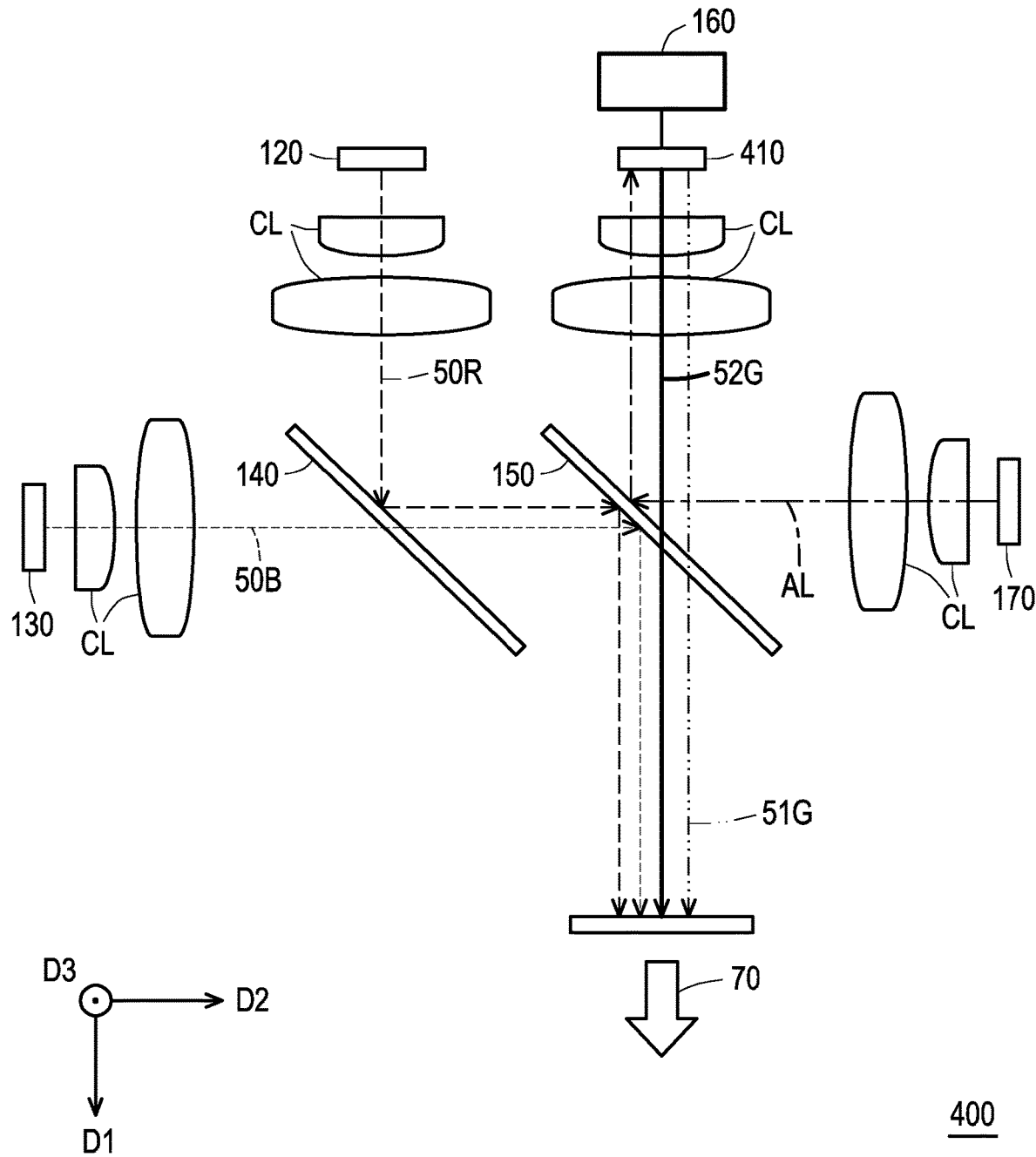
FIG. 4A is a schematic diagram of the optical path architecture of another illumination system of FIG. 1.
Figure 4B:
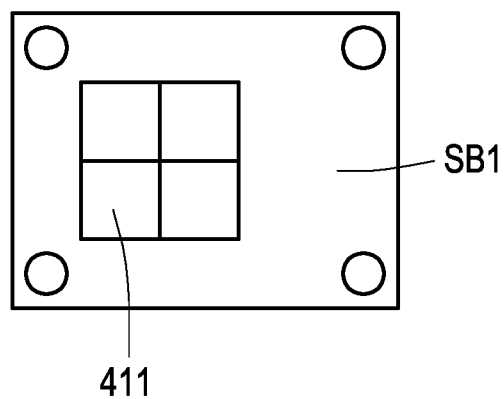
FIG. 4B and FIG. 4C are respectively schematic front views of the first light-emitting element and the second light-emitting element of FIG. 4A.
Figure 4C:
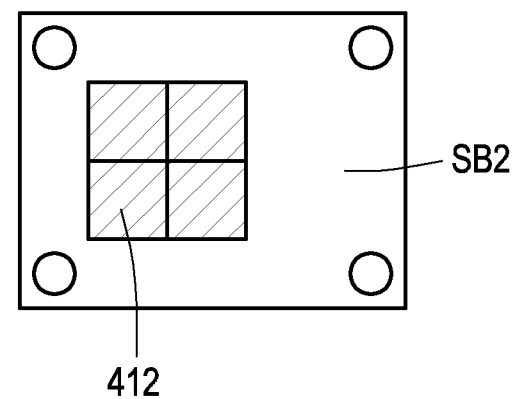

FIG. 4A is a schematic diagram of the optical path architecture of another illumination system of FIG. 1. FIG. 4B and FIG. 4C are respectively schematic front views of the first light-emitting element and the second light-emitting element of FIG. 4A. Please refer to FIG. 4A to FIG. 4C. An illumination system 400 of FIG. 4A is similar to the illumination system 100 of FIG. 2A, and the differences are as follows. In the embodiment, the first light-emitting element 411 and the second light-emitting element 412 of the first light-emitting unit 410 are packaged on different substrates SB1 and SB2, and the transmission directions of the first sub-light beam 51G and the second sub-light beam 52G to the second dichroic element 150 are the same. In other words, in the embodiment, the first light-emitting element 411 and the second light-emitting element 412 of the first light-emitting unit 410 may be disposed side by side in a third direction D3, for example. In this way, the light-receiving area of the first sub-light beam 51G and the second sub-light beam 52G is increased, and the optical efficiency thereof may be further improved. In addition, when the auxiliary light-emitting unit 170 is provided, the optical paths of the auxiliary light-emitting unit 170 and the second light-emitting element 412 need to be aligned, so that the auxiliary light beam AL is transmitted to the second light-emitting element 412.

In this way, the illumination system 400 may also be configured to execute the projection control method of FIG. 3. Moreover, the control unit 160 is configured to control the ratios of different currents passing through the first light-emitting element 411 and the second light-emitting element 412, so that the composition of the green light in the illumination light beam 70 may be adjusted, so that the illumination system 400 may meet the requirements of efficacy and color performance, and may achieve similar effects and advantages to the above illumination system 100, which are not repeated herein. Moreover, when the illumination system 400 is applied to the projection device 200, the projection device 200 may also achieve the above effects and advantages, which are not repeated herein.

Figure 5:
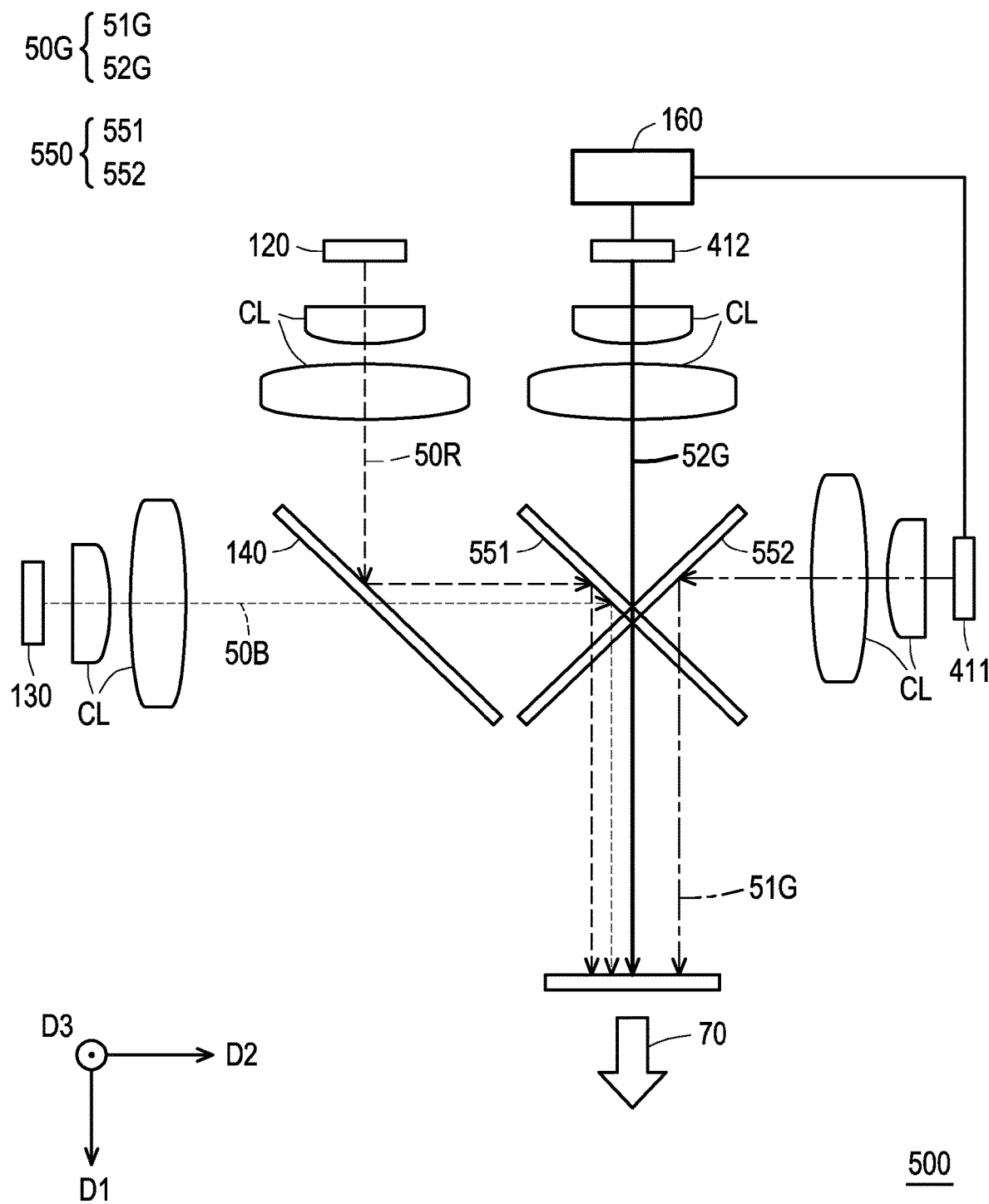
FIG. 5 is a schematic diagram of the optical path architecture of yet another illumination system of FIG. 1.

FIG. 5 is a schematic diagram of the optical path architecture of yet another illumination system of FIG. 1. Please refer to FIG. 5. An illumination system 500 of FIG. 5 is similar to the illumination system 400 of FIG. 4A, and the differences are as follows. In the embodiment, the second dichroic element 550 is an X-type dichroic mirror, and includes a first sub-dichroic element 551 and a second sub-dichroic element 552 not disposed side-by-side (for example, perpendicular and intersected in the middle of the element), wherein the first sub-dichroic element 551 has the same optical function and arrangement position as the second dichroic element 150 of FIG. 2A, and may reflect the second light beam 50R and the third light beam 50B and let the first light beam 50G pass through.

Moreover, as shown in FIG. 5, in the embodiment, the first sub-light beam 51G of the first light-emitting element 411 and the second sub-light beam 52G of the second light-emitting element 412 of the first light-emitting unit 410 are incident on the second dichroic element 550 (the second sub-dichroic element 552) in different transmission directions, and the second sub-dichroic element 552 of the second dichroic element 550 reflects one of the first sub-light beam 51G and the second sub-light beam 52G and lets the other of the first sub-light beam 51G and the second sub-light beam 52G pass through. More specifically, in the embodiment, the first light-emitting element 411 and the second light-emitting element 412 are located at different sides of the second sub-dichroic element 552 of the second dichroic element 550, and are for example, respectively located at two sides of the normal line of the surface of the first sub-dichroic element 551 of the second dichroic element 550 facing the first light-emitting element 411 and the second light-emitting element 412 (the first light-emitting element 411 and the second light-emitting element 412 are located at the same side of the first sub-dichroic element 551 of the second dichroic element 550). In this way, the first sub-light beam 51G and the second sub-light beam 52G may be incident on the second sub-dichroic element 552 of the second dichroic element 550 along the opposite directions of the first direction D1 and the second direction D2, respectively. Moreover, in the embodiment, the second sub-dichroic element 552 of the second dichroic element 550 reflects the first sub-light beam 51G and lets the second sub-light beam 52G pass through.

Moreover, it should be mentioned that, due to the limitation of the above optical path configuration, in the embodiment, the auxiliary light-emitting unit 170 is not provided. Therefore, the performance is slightly lower than the model of the illumination system 100 including the auxiliary light-emitting unit 170, but the illumination system 500 may still be configured to implement the projection control method of FIG. 3. Moreover, the different current ratios of the first light-emitting element 411 and the second light-emitting element 412 are controlled via the control unit 160, so that the composition of the green light portion in the illumination light beam 70 may be adjusted. Therefore, the illumination system 500 may meet the requirements of both efficacy and color performance, and may achieve similar effects and advantages to the illumination system 400, which are not repeated herein. Moreover, when the illumination system 500 is applied to the projection device 200, the projection device 200 may also achieve the above effects and advantages, which are not repeated herein.

Based on the above, the embodiments of the invention have at least one of the following advantages or efficacies. In an embodiment of the invention, the illumination system and the projection device may control the different current ratios of the first light-emitting element and the second light-emitting element via the control unit, so as to adjust the composition of the green light portion in the illumination light beam. In turn, the illumination system and the projection device may meet the requirements of both efficacy and color performance. Moreover, the projection control method of the embodiment may readily switch the illumination system and the projection device between the high-performance mode and the high-chroma mode. Therefore, the efficacy and color performance requirements of the illumination system and the projection device may both be met.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An illumination system, comprising:
a first light-emitting unit comprising a first light-emitting element and a second light-emitting element, wherein the first light-emitting element provides a first sub-light beam, and the second light-emitting element provides a second sub-light beam, a main light emission wavelength range of the first sub-light beam falls within a main light emission wavelength range of the second sub-light beam, and the main light emission wavelength range of the second sub-light beam is greater than the main light emission wavelength range of the first sub-light beam;
a second light-emitting unit configured to provide a second light beam;
a third light-emitting unit configured to provide a third light beam;
a first dichroic element located on a transmission path of the second light beam and the third light beam;
a second dichroic element located on a transmission path of the first sub-light beam, the second sub-light beam, the second light beam, and the third light beam, wherein the second light beam is transmitted to the second dichroic element after being reflected by the first dichroic element, the third light beam is transmitted to the second dichroic element after passing through the first dichroic element, the second light beam and the third light beam are reflected by the second dichroic element to form a portion of an illumination light beam, and at least one of the first sub-light beam and the second sub-light beam is reflected by the second dichroic element or passes through the second dichroic element to form another portion of the illumination light beam; and
a control unit electrically connected to the first light-emitting unit and configured to switch the illumination system between a high-performance mode and a high-chroma mode, wherein when the illumination system is in the high-performance mode, the control unit controls a current ratio of the second light-emitting element to be greater than a current ratio of the first light-emitting element, and when the illumination system is in the high-chroma mode, the control unit controls the current ratio of the second light-emitting element to be less than the current ratio of the first light-emitting element.

2. The illumination system of claim 1, wherein the first dichroic element and the first light-emitting unit are respectively located at two sides of the second dichroic element.

3. The illumination system of claim 1, further comprising:
an auxiliary light-emitting unit configured to provide an auxiliary light beam, wherein the auxiliary light-emitting unit and the first light-emitting unit are located at a same side of the second dichroic element, and the auxiliary light beam is transmitted to the second light-emitting element after being reflected by the second dichroic element.

4. The illumination system of claim 1, wherein the first light-emitting element and the second light-emitting element are packaged on a same substrate.

5. The illumination system of claim 1, wherein the first light-emitting element and the second light-emitting element are packaged on different substrates, and transmission directions of the first sub-light beam and the second sub-light beam incident on the second dichroic element are the same.

6. The illumination system of claim 1, wherein the first light-emitting element and the second light-emitting element are packaged on different substrates, transmission directions of the first sub-light beam and the second sub-light beam incident on the second dichroic element are different, and the second dichroic element reflects one of the first sub-light beam and the second sub-light beam and lets the other of the first sub-light beam and the second sub-light beam pass through.

7. The illumination system of claim 1, wherein when the projection device is in the high-performance mode, the control unit controls the current ratio of the second light-emitting element to be 90% to 95%, and controls the current ratio of the first light-emitting element to be 5% to 10%, and when the projection device is in the high-chroma mode, the control unit controls the current ratio of the second light-emitting element to be 5% to 10%, and controls the current ratio of the first light-emitting element to be 90% to 95%.

8. The illumination system of claim 1, wherein the main light emission wavelength range of the first sub-light beam is between 570 nm and 585 nm, and the main light emission wavelength range of the second sub-light beam is between 490 nm and 590 nm.

9. A projection device, comprising:
an illumination system, comprising:
  a first light-emitting unit comprising a first light-emitting element and a second light-emitting element, wherein the first light-emitting element provides a first sub-light beam, and the second light-emitting element provides a second sub-light beam, a main light emission wavelength range of the first sub-light beam falls within a main light emission wavelength range of the second sub-light beam, and the main light emission wavelength range of the second sub-light beam is greater than the main light emission wavelength range of the first sub-light beam;
  a second light-emitting unit configured to provide a second light beam;
  a third light-emitting unit configured to provide a third light beam;
  a first dichroic element located on a transmission path of the second light beam and the third light beam;
  a second dichroic element located on a transmission path of the first sub-light beam, the second sub-light beam, the second light beam, and the third light beam, wherein the second light beam is transmitted to the second dichroic element after being reflected by the first dichroic element, the third light beam is transmitted to the second dichroic element after passing through the first dichroic element, the second light beam and the third light beam are reflected by the second dichroic element to form a portion of an illumination light beam, and at least one of the first sub-light beam and the second sub-light beam is reflected by the second dichroic element or passes through the second dichroic element to form another portion of the illumination light beam; and
  a control unit electrically connected to the first light-emitting unit and configured to switch the illumination system between a high-performance mode and a high-chroma mode, wherein when the illumination system is in the high-performance mode, the control unit controls a current ratio of the second light-emitting element to be greater than a current ratio of the first light-emitting element, and when the illumination system is in the high-chroma mode, the control unit controls the current ratio of the second light-emitting element to be less than the current ratio of the first light-emitting element;
at least one light valve disposed on a transmission path of the illumination light beam and configured to convert the illumination light beam into an image light beam; and
a lens module disposed on a transmission path of the image light beam and configured to project the image light beam out of the projection device.

10. The projection device of claim 9, wherein the main light emission wavelength range of the second sub-light beam transmitted to the second dichroic element is the same as the main light emission wavelength range of the second sub-light beam transmitted to the at least one light valve.

11. A projection control method, configured to switch a projection device between a high-performance mode and a high-chroma mode, wherein the projection device comprises an illumination system according to claim 1, and the projection control method comprises:
  controlling a current ratio of the second light-emitting element to be greater than a current ratio of the first light-emitting element when the projection device is in the high-performance mode; and
  controlling the current ratio of the second light-emitting element to be less than the current ratio of the first light-emitting element when the projection device is in the high-chroma mode.

12. The projection control method of claim 11, further comprising:
  determining whether the projection device needs to be switched to the other of the high-performance mode and the high-chroma mode when the projection device is in one of the high-performance mode and the high-chroma mode; and
  switching the projection device to the other of the high-performance mode and the high-chroma mode if yes, and keeping the projection device in the one of the high-performance mode and the high-chroma mode if not.

\* \* \* \* \*